United States Patent Office 2,780,209
Patented Feb. 5, 1957

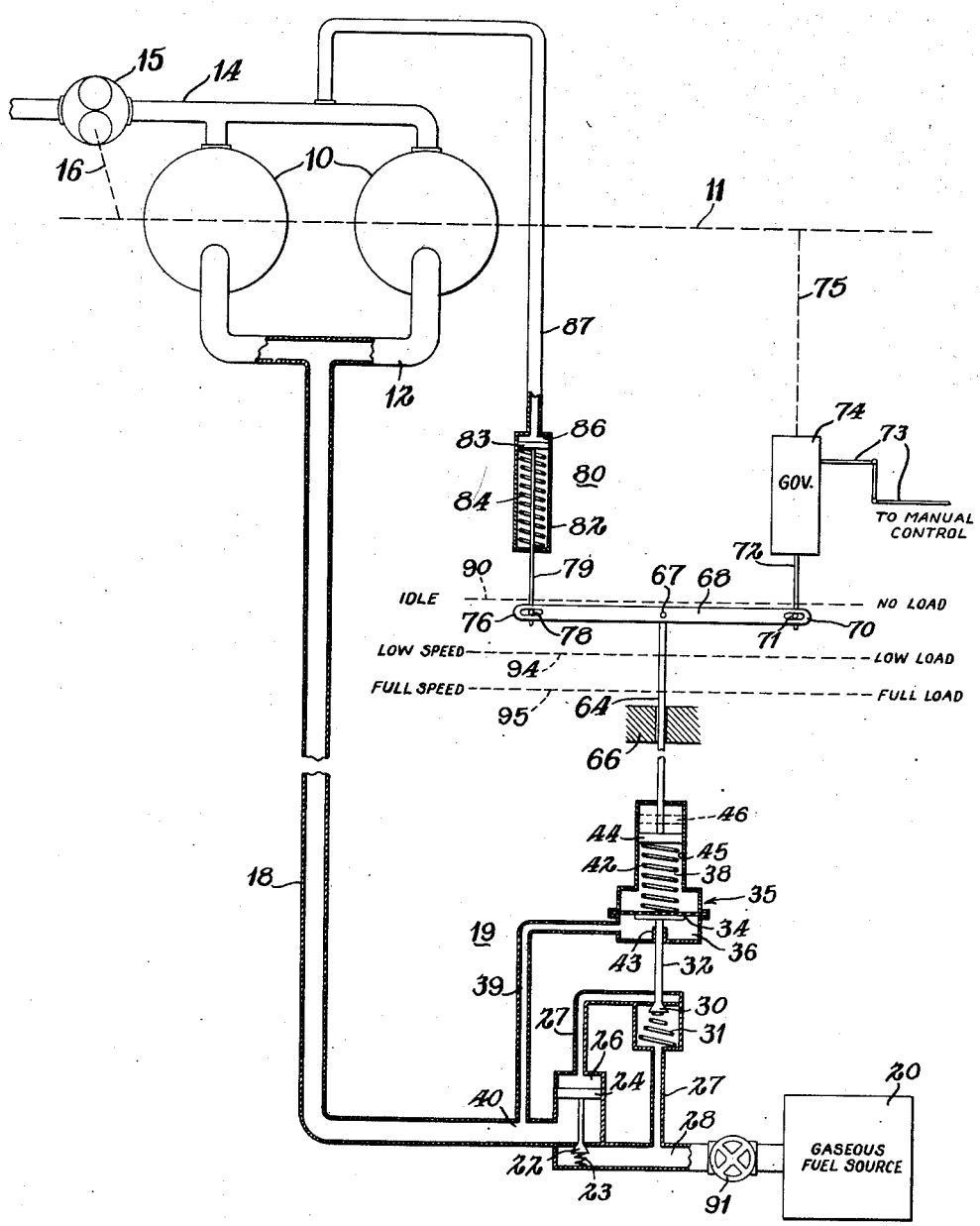

2,780,209

ENGINE FUEL DELIVERY CONTROL

Harry J. Renken, Dallas, Tex., assignor to Fairbanks, Morse & Co., Chicago, Ill., a corporation of Illinois Application July 20, 1955, Serial No. 523,300

5 Claims. (Cl. 123—103)

This invention relates to improvements in the control of fuel delivery to internal combustion engines, and has particular reference to a novel method and manner of regulating fuel supply to engines operable on gaseous fuels.

Engines adapted for operation on gaseous fuels such as propane and the like, are now in relatively wide use with oil drilling rigs and the like, as for operating slush pumps, drill line hoists and other rig equipment. In connection with engines in such use, gaseous fuel is supplied from a fuel source maintained under a substantially constant predetermined supply pressure, with engine delivery of fuel controlled by a throttle valve positioned by an engine driven governor operating responsively to and in accordance with engine torque output or loading. The governor of the type usually employed for controlling the fueling of these engines, is adjustable to and between adjustment settings corresponding to high and low engine speeds, whereby to effect conditioning of the governor for proper load response under various engine speeds.

In the operation of gas engines having a fueling system of the character above indicated, it is found in practice and particularly in connection with drill rig operation, that the operator usually effects governor adjustment to its high speed setting upon any load application to the engine irrespective of whether the applied load is light, intermediate or at the maximum of engine capacity. Moreover, such adjustment generally is effected quite rapidly, as by a quick throw of the governor adjustment to the maximum or high speed setting. As a result, the immediate response of the governor to the applied load, is such as to open the throttle valve to its full open position or at least to an open position greatly in excess of that required for effective fueling of the engine in its acceleration to the speed necessary to carry the then applied load. Consequently, gaseous fuel delivery to the engine is in such quantity as to result in over-rich fuel mixtures which are difficult if not impossible to ignite. Moreover, even though localized ignition may occur as in the immediate region of the ignition device in the cylinder, as a spark plug for example, the remainder of the over-rich mixture usually will quench the initial flame, thus precluding fuel combustion. The result, of course, is that the engine ceases operating or stalls, requiring the operator to restart the engine and make another attempt to place it in operation under the desired load. Very often in drill rig operation, such stalling condition is produced at critical times. Hence, it is highly important to provide a fuel control system which will avoid the difficulty hereinabove described, and which will assure proper engine fueling under all conditions.

The principal object of the present invention, then, is to provide a novel method and manner of controlling gaseous fuel supply to a gas engine which will avoid the disadvantages hereinabove mentioned, attending the single governor operated control, and which will facilitate proper engine operation at all speeds and loads within the range of the engine.

Another object is to provide for engine delivery of gaseous fuel in quantity and pressure determined in direct accordance with both engine speed and engine torque output or loading, whereby to obtain proper cylinder fuel mixtures throughout the operating range of the engine.

A further object is to provide in a system for supplying gaseous fuel to an engine, a pressure actuated throttle valve device embodying an adjustable pressure-sensitive regulator for determining pressure operation of the valve to determine the pressure and quantity of fuel delivery to the engine, and regulator adjustment effecting means operated in accordance with both engine speed and engine torque output or loading.

Other objects and advantages of the invention will appear from the following description of one exemplary embodiment thereof illustrated in the accompanying drawing, wherein the single figure of the drawing discloses diagrammatically, a presently preferred form of fuel control system according to this invention.

Referring to the drawing, only so much of an internal combustion engine as is necessary to a full understanding of the present invention, is here shown in schematic manner. The portion of the engine shown includes engine cylinders 10, the engine crankshaft indicated by the broken line 11 representing the crankshaft axis, a fuel intake manifold 12 for cylinder delivery of gaseous fuel, and a scavenging and charging air supply manifold 14 for cylinder supply of air under pressure established by a suitable air compressor or blower 15. The compressor is driven from the engine crankshaft, as indicated by the broken line drive connection 16, and is of a type or character to produce and maintain compressed air in the manifold 14 at a pressure directly proportional to engine speed. A fuel supply conduit 18 containing a fuel control or fuel throttle device 19 hereinafter to be described, connects the engine fuel manifold 12 with a source of gaseous fuel, as the supply tank 20, wherein gaseous fuel is maintained under a substantially constant, determined supply pressure, as for example, a pressure of 40 pounds per square inch.

In accordance with the present invention, the fuel throttling device 19 is provided and adapted for regulation in accordance with both engine speed and engine torque output as a measure of engine loading, to determine the quantity and pressure of gaseous fuel in delivery to the engine under all operating conditions of the engine. The device 19 apart from the engine speed and load control provision therefor, may be an adjustable pressure regulator of any known, readily available type. The form thereof shown diagrammatically for purposes of present illustration of the application of the invention, comprises essentially a main throttling valve of piston type controlled in throttling position through a pilot valve positionable according to the differential between the pressure of the fluid at the outlet side of the main valve and the tension of a pilot valve loading spring.

Referring to the drawing, the device 19 provides a main valve 22 controlling gaseous fuel flow in conduit 18 from the supply tank 20 to the engine, this valve including a spring 23 urging the valve to closed position, and a valve actuating piston 24 operable in pressure cylinder 26. Gaseous fuel under tank pressure, is delivered to cylinder 26 through a conduit 27 connected to the inlet side 28 of the main valve and having therein a pilot valve 30 biased to closed position by a suitable spring 31. The stem 32 of pilot valve 30 is connected to a movable diaphragm 34 in a casing 35, the diaphragm dividing the casing into a lower pressure chamber 36 and an upper control spring chamber 38. Pressure chamber 36 communicates by conduit 39, with the discharge side of the main valve, as at 40. A relatively light compression spring 42 is disposed in the spring chamber 38 in engagement with the pilot valve diaphragm 34, urging the diaphragm toward the stop 43 in chamber 36 determining the maximum open condition of the pilot valve 30. In the usual pressure regulator of the form schematically shown, the upper end of spring 42 is engaged by an adjustable screw device or the like (not shown) through which the effective tension or compression force of the spring is adjusted to determine the pressure regulating function of the device. However, the manner of effecting adjustment of spring 42 is here modified in accordance with the present invention, as will be presently described.

While the function or operation of a pressure regulator, as of the form illustrated, is well known, it is desired to point out here that where the fuel supply pressure at the main valve inlet 28 may be at, say, 40 pounds per square inch and it is desired to have the fuel passing outwardly in conduit 18 from the valve discharge, at say a pressure of 30 pounds per square inch, the pilot valve regulating spring 42 loading the diaphragm 34, is adjusted to determine a part-open condition of the pilot valve 30. The pilot valve effects throttled delivery of fluid from the high pressure side to the chamber 26, causing through piston 24 a part-open condition of the main valve 22. The main valve effects a throttling of fluid flow at the discharge side, with corresponding pressure reduction, so that by proper adjustment of spring 42 for the desired 30 pound output pressure, the diaphragm 34 will occupy a position wherein the spring 42 balances the opposing pressure in chamber 36 equivalent to 30 pound pressure at the main valve outlet and in conduit 18. The 30 pound output pressure is, of course, reflected in diaphragm chamber 36 through the conduit 39. Normally in a pressure regulator as shown, once the spring 42 is adjusted for the desired 30 pound output pressure in conduit 18 (under the pressure example given), the diaphragm 34 will respond to the differential pressure between the adjusted pressure of spring 42 and the fluid pressure in chamber 36 rising or falling due to equivalent rise or fall in the pressure of the fluid at the outlet of the main valve 22. Resulting diaphragm movement will correspondingly decrease or increase the open condition of the pilot valve 30 and thereby reduce or increase the fluid pressure acting on main valve piston 24. Consequently, the open condition of the main valve 22 will be decreased or increased such as to restore the output pressure to the desired value. The regulator functions in similar manner, to maintain the output pressure even though pressure variations occur at the fluid inlet side 28 of the main valve.

It will be appreciated now that the pressure of the fluid flowing in conduit 18 from the main valve outlet, as well as the quantity flow thereof, may be varied within the control range of such a regulator of given capacity, by varying the tension or compression force of the pilot valve regulating spring 42. Accordingly and within the perview of the present invention, there is disposed in engagement with the upper end of spring 42 an abutment member or piston element 44 which is vertically slidable in the cylinder portion 45 of casing 35, to and from an initial position indicated in dotted lines at 46. In such initial position, the spring 42 will be expanded to unload the diaphragm sufficiently to permit pilot valve spring 31 to close pilot valve 30. Although not here shown, any suitable relief provision may be made for discharge of fluid from the portion of conduit 27 between valve 30 and chamber 26 of the main valve piston 24, when the pilot valve 30 is closed, so that spring 23 may close the main valve 22. Spring compressing positionment of the slide piston 44 for causing the regulator device 19 to determine the quantity and pressure of gaseous fuel flow in conduit 18 to the engine, is effected in accordance with both engine speed and engine load conditions by control mechanism now to be described.

As shown diagrammatically in the drawing, connected to piston 44 is an actuating member or piston rod 64 vertically reciprocable in a fixed guide 66. Pivotally connected at its mid-point 67 to the upper end of rod 64 is a lever or operating member 68. One end 70 of member 68 is in pivotal pin and slot connection 71 to the operating element 72 of an engine driven speed-settable governor 74 of suitable type, driven from the engine crankshaft 11 as indicated by the broken line 75, and functioning to position its operating element 72 in direct accordance with engine torque output or engine loading. It may be noted here that the governor 74 includes speed-setting adjustment mechanism (not shown) of well known character in load responsive governors of this type, with such setting mechanism under adjustment control by the usual manual engine speed control (not shown) through suitable linkage 73.

The other end 76 of lever 68 is pivotally connected, as by pin and slot connection 78, to the operating element 79 of an engine speed responsive device 80. As here indicated, device 80 comprises a cylinder 82 having a movable piston 83 therein to which the element 79 is connected, and a spring 84 urging the piston toward the cylinder head end 86. The cylinder at its head end 86, is connected in fluid pressure communication with the engine air manifold 14 through conduit 87. Thus, since the air pressure in manifold 14 varies directly with engine speed (as previously noted), the position of piston 83 and hence of the operating element 79, will be in direct accordance with engine speed. From th foregoing it will appear that the member 68 in connection at its ends to the movable elements of the engine load responsive device 74 and engine speed responsive device 80, constitutes a floating lever having its center or mid-point 67 constrained by the rod 64 to linear displacement along the axis of rod 64. Consequently the position of such mid-point 67 is the resultant of the relative positions of elements 72 and 79, so that the adjustments or regulation of the spring 42 as effected through rod 64 and piston 44, appears as a conjoint function of engine speed and engine torque output or load.

In the inactive conditions of devices 74 and 80 (engine shut down), the floating lever 68 will occupy an initial position indicated in broken lines at 90, thereby locating piston 44 at its initial position 46 wherein pilot valve 30 is closed. The main fuel throttling valve 22 then is closed (as before indicated), so that fuel delivery is cut-off from conduit 18. The engine may be started in any suitable, known manner (not here shown) and once started with the main gas valve 91 in open condition, the operation of the fuel control is as follows:

The governor 74 then normally adjusted through linkage 73 to a low speed setting as for initial no-load, idling operation to the engine, actuates lever 60 initially about pin connection 78 as a fulcrum, to depress rod 64 and hence increase the tension of spring 42. This results in pilot valve opening to cause opening of main or throttle valve 22 to an initial extent, establishing fuel delivery in pressure and quantity sufficient to produce engine acceleration. Now as the engine accelerates, the speed responsive device 80 responds by moving the lever 60 to depress rod 64 and increase the tension of spring 42 progressively with acceleration, thereby causing proportionately greater opening of the throttle valve, and, hence, increasing fuel delivery to the engine for bringing it to no-load, idling speed operation. When the latter is reached, the floating lever will occupy the solid line position shown, as determined conjointly by the governor 74 and speed responsive device 80, wherein the spring 42 is tension-adjusted for determining pilot valve operation to control the open condition of the throttle valve 22 for maintaining pressure and quantity fuel feed to the engine such as to establish and maintain no-load, idling speed operation of the engine.

It is to be noted here in connection with the foregoing, that were the governor 74 to be applied directly to rod 64, its action under certain conditions including governor adjustment to a speed setting above its low or idle speed setting, would so tension the spring 42 as to cause pilot valve opening of the throttle valve 22 to an inordinate extent. The result would be an over-fueling of the engine (as hereinbefore indicated), with over-rich fuel mixtures producing no better than sporadic engine firing and, more usually, engine stalling. With the present regulating system, however, governor operation of the floating lever 60 initially about the pin 78 as a fulcrum, precludes governor over-tensioning of the spring 42 such as would result in engine over-fueling as indicated. Thus, with the floating lever adjustment control as now provided, the solid line position of lever 60 determining proper engine fueling in no-load, idling speed operation of the engine, is that effected conjointly by the governor 74 then in its no-load, idle speed operating conditions, and the device 80 then actuated to an extent corresponding to engine idling speed.

Considering load application to the engine, the operator upon engine loading, may and usually will adjust the governor to its high speed adjustment setting irrespective of whether the applied load is low, intermediate or a maximum. The initial governor action then is to move its end of the lever 60 toward or even to its full load position, so that were the governor acting directly on the spring 42, the latter would be tensioned for causing high or maximum fueling of the engine and resultant engine stalling. However, with the present system, such result is avoided in the same manner as above described in connection with bringing the engine to normal no-load, idling speed operation. Even though the governor end of the lever 60 may be moved to full load position in the initial phase upon engine loading, the lever then pivoting about connection 78 at the speed operated end thereof, reduces the initial extent of spring adjustment to a point resulting in throttle valve opening to determine engine fueling in degree below over-fueling thereof, but sufficient to assure acceleration of the engine toward a speed commensurate with the then applied load. As acceleration occurs, the speed responsive device 80 moves its end of the floating lever downwardly, while as the engine approaches the speed required for the applied load, the governor 74 adjusts the position of its end of the lever to accord with the applied load. The result is that the lever 60 will be located by the governor 74 and the speed responsive device 80 as the engine attains its operating speed required for the applied load, in a position such for example, as the dotted line position 94 for a low load and corresponding low speed (assuming the load applied is a low load). In this lever position, the spring 42 will be adjusted to a tension conditioning the pilot valve control for actuation of the throttle valve to maintain fuel delivery in pressure and quantity for proper engine operation under the load condition indicated.

Increasing the load on the engine results in like functioning of the control, and such that under full load and when the engine speed attains its full speed for such load the lever 60 will occupy the maximum terminal position indicated by the dotted line showing 95. With decrease in load or load removal, the reverse of the foregoing function takes place, as this will be now appreciated. The fuel control provision thus effects regulation of gaseous fuel admission to the engine to establish such pressure and quantity of fuel delivery as will avoid difficult and impossible to ignite rich mixtures and consequent engine overloading and stalling.

It is to be noted here that the control mechanism as herein provided, is effective as an engine overload control under any speed and load operating condition of the engine. For example, assume that the engine is in normal operation at say three-quarter speed under full or one-hundred percent load for such speed. Now, should the engine be subjected to a sudden or rapidly applied overload well beyond the engine capacity at such speed, as say a one-hundred and forty percent load, the governor 74 will respond by displacement of floating lever 68 at end 70 thereof, toward full load position. Lever 68 then pivoting about its connection 78 to speed responsive device 80, causes increased tensioning of the control spring 42 and resultant increase in fuel delivery to the engine. However, under the overload indicated, the increase in fuel is not sufficient to effect engine acceleration in an attempt to carry the load. Therefore, unless the overload is promptly removed, the engine speed will drop with resulting operation of device 80 to lift its end of lever 68 and, hence, decrease the tension of spring 42. The latter causes reduction in fuel delivery to the engine, so that the engine will stall or cease operation. Thus, the control functions to preclude engine operation in any materially overloaded condition.

While in the diagrammatic, exemplary embodiment of the engine fuel control system as shown, the pressure operated, engine speed responsive device 80 is actuated by air pressure from the engine air supply manifold 14, it is to be understood that the device 80 may be provided or adapted for response to any other fluid system embodied in the engine and in which the pressure or temperature of the fluid therein varies in direct accordance with engine speed. For example, such other fluid system may be the jacket cooling water system of the engine (not shown) in which the temperature of the cooling water or other coolant fluid is proportional to engine speed, or it may be the pressure lubricating oil system of the engine (also not shown).

In accordance with the improved method and manner of engine fuel delivery control as herein provided, it will appear now that the fuel supplied to the engine is controlled in respect to pressure and quantity delivery thereof, by regulation of the fuel supply in direct accordance with both engine speed and engine torque output or loading, and that such regulation is effected in the preferred manner shown, by a pressure regulator adjusted in accordance with both engine speed and engine loading.

Having now described and illustrated the present invention, what it is desired to claim and secure by Letters Patent is:

1. In an internal combustion engine operable on gaseous fuel, a fuel supply system for the delivery of gaseous fuel under pressure to the engine, said system including a control device regulatable for determining the quantity and pressure of gaseous fuel in delivery to the engine, engine operated regulating means having an actuating element positionable in accordance with engine loading, regulating means operatively associated with the engine and having an actuating element positionable in accordance with engine speed, and an operating lever connected at its ends to said actuating elements and connected intermediate its ends to said control device, positionable conjointly by said regulating means for regulating said control device to determine the quantity and pressure of gaseous fuel delivery to the engine in accordance with engine speed and loading.

2. In an internal combustion engine operable on gaseous fuel and having a fluid pressure system in which the pressure of the fluid therein is in direct accordance with engine speed, a fuel supply system for the delivery of gaseous fuel under pressure to the engine, said supply system including a control device regulatable for determining the quantity and pressure of gaseous fuel delivered to the engine, engine operated regulating means having an actuating element positionable in accordance with engine loading, fluid pressure operated regulating means connected to said fluid pressure system and having an actuating element positionable in accordance with engine speed, and an operating lever connected at its ends to said actuating elements and connected substantially at its midpoint to said control device, operable conjointly by the regulating means for regulating said control device to determine the quantity and pressure of gaseous fuel delivered to the engine in accordance with engine speed and loading.

3. In an internal combustion engine operable on gaseous fuel and having a fluid pressure system in which the pressure of the fluid therein is in direct proportion to engine speed, a fuel supply system for the delivery of gaseous fuel under pressure to the engine, said supply system including means providing a source of gaseous fuel under a predetermined pressure and a supply conduit between the source and the engine; a fuel throttling device in said conduit, including a control positionable for regulating the device to determine the quality and pressure of fuel delivery to the engine, an adjustable spring, and means sensitive to the differential between the fuel pressure in the conduit on the engine delivery side of the throttling device and the force of said spring, for positioning said control; an engine driven governor having an operating element positionable in direct proportion to engine loading, pressure operated means connected to said fluid pressure system and having an operating element positionable in direct proportion to engine speed, and means operated conjointly by said operating elements for adjusting said spring.

4. In an internal combustion engine operable on gaseous fuel and having a fluid pressure system in which the pressure of the fluid therein is in direct proportion to engine speed, a fuel supply system for the delivery of gaseous fuel under pressure to the engine, including a delivery conduit; a fuel throttling device in said delivery conduit, including a control operable for regulating the device to determine the quantity and pressure of fuel delivery to the engine, a diaphragm actuator for said control, means subjecting said actuator at one side thereof to fuel pressure in the conduit on the engine delivery side of the throttling device, an adjustable spring acting on said actuator at the opposite side thereof, the actuator being sensitive to the differential between the pressure of the fuel in the conduit on the engine delivery side of the throttling device and the opposing force of said spring, for operating said control, an engine driven governor having an operating element positionable in accordance with engine loading, pressure operated means connected to said fluid pressure system and having an operating element positionable in accordance with engine speed, and means operated conjointly by said operating elements for adjusting said spring.

5. The combination according to claim 4 wherein the said means operated conjointly by said operating elements for adjusting said spring, comprises a floating lever connected at its ends to said operating elements, and an abutment member connected to the mid-point of the floating lever and engaging the said spring.

References Cited in the file of this patent
UNITED STATES PATENTS

| | | |
|---|---|---|
| 2,328,452 | Hobart | Aug. 31, 1943 |
| 2,529,437 | Weinberger | Nov. 7, 1950 |
| 2,722,926 | Bradnick | Nov. 8, 1955 |
| 2,727,501 | Worth | Dec. 20, 1955 |